No. 878,955. PATENTED FEB. 11, 1908.
H. K. HOLSMAN.
DRIVING MECHANISM FOR AUTOMOBILES.
APPLICATION FILED APR. 20, 1907.

Witnesses:
Inventor:
Henry K. Holsman

UNITED STATES PATENT OFFICE.

HENRY K. HOLSMAN, OF CHICAGO, ILLINOIS.

DRIVING MECHANISM FOR AUTOMOBILES.

No. 878,955.

Specification of Letters Patent.

Patented Feb. 11, 1908.

Application filed April 20, 1907. Serial No. 369,199.

*To all whom it may concern:*

Be it known that I, HENRY K. HOLSMAN, a citizen of the United States, and a resident of Chicago, in the county of Cook and State of Illinois, have invented certain new and useful Improvements in Driving Mechanism for Automobiles, of which the following is a full, clear, and exact specification.

My invention is concerned with certain improvements in driving mechanism for automobiles, and more especially with the reverse driving mechanism, of the general type shown in my Patent No. 697,720, granted April 15, 1902, in which the vehicle is reversed or driven backward by reason of the reverse disks carried by the driving shaft being thrown backward and brought directly in contact with the tread surface of the tires of the traction wheels, the rearward movement of the driving shaft serving at the same time to loosen the tension on the ropes which drive the vehicle forward. This direct engagement of the reverse disks with the tread surface of the tires tends to wear them out rapidly where soft rubber tires are employed, and to remedy this difficulty as well as to secure a more powerful and efficient drive, I provide the novel structure shown, in which the reverse disks have peripheral grooves whose sides make small angles with each other, so that the rubber tire or tread surface is not engaged by the reverse disk, which engages only with the iron rim of the wheel, leaving the tire or tread surface untouched, and consequently unaffected by the friction and strain which otherwise would result when the vehicle is backed.

Figure 1:
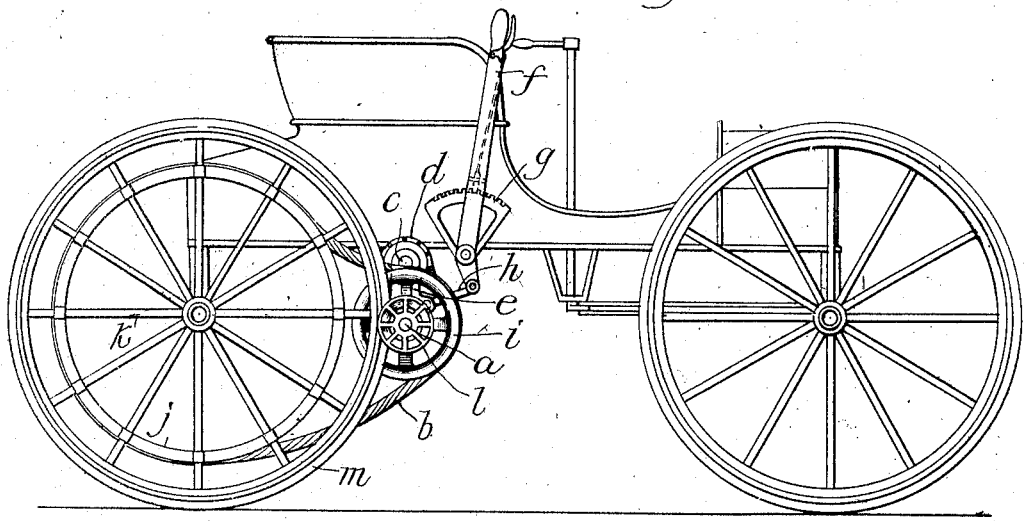
Figure 2:
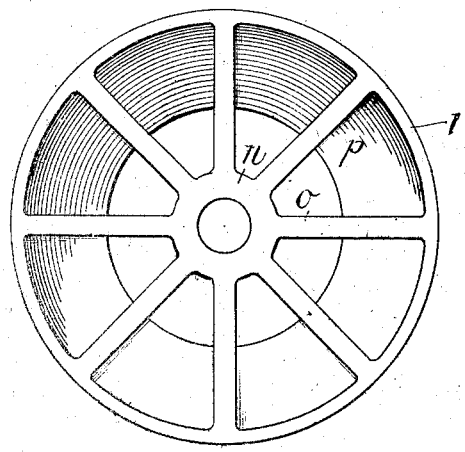
Figure 3:
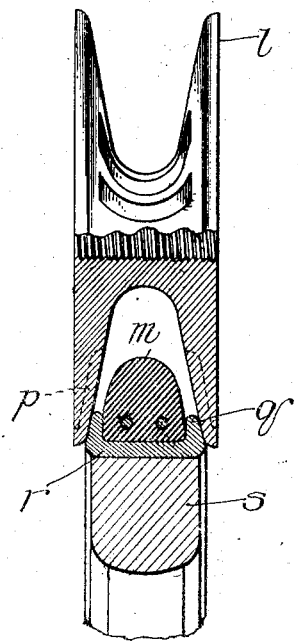

To illustrate my invention, I annex hereto a sheet of drawings, in which the same reference characters are used to designate identical parts in all the figures, of which, Figure 1 is a side elevation of an automobile having my invention applied thereto; Fig. 2 is a side elevation of one of the reverse disks; and Fig. 3 is an edge view of the same, with the lower half in section, showing the engagement of the disk with the rim of the wheel.

It will be understood that the general driving mechanism of this type of automobile consists of the driving shaft $a$, which may be directly connected to a motor which moves with it to tighten or loosen the driving rope $b$, or which may be driven from a motor shaft $c$ mounted in stationary bearings and suitably geared thereto, as by sprocket wheels and the chain $d$. As shown, the shaft $a$ is supported in bearings carried by the links $e$, and a controlling lever $f$, which coöperates with a suitable detent segment $g$, has the link $h$ at the lower end connecting the lever to the links $e$, so that the shaft $a$ may be thrown forward in position so that the rope $b$, which runs over the sheave $i$ secured to the shaft $a$ and over the pulley rim $j$ secured to the spokes of the traction wheel $k$, may be tightened so as to drive the vehicle forward. When the vehicle is to be reversed, the lever $f$ is moved in the opposite direction so as to carry the shaft $a$ to the rearward, so as to bring the reverse disk $l$, which is in the vertical plane of the rim of the wheel $k$, into engagement with the periphery of the traction wheel to drive the vehicle backward.

As seen in my aforesaid prior patent, No. 697,720, the reverse disk $l$ (there lettered $i$) is only slightly concaved on its periphery which engages the tire $m$ directly. In my improved construction, the reverse disk $l$ has the deep groove therein, which is shown as formed by providing the hub $n$ secured upon the shaft $a$ with the deeply-recessed spokes $o$, which carry the annular webs $p$ which stand at an acute angle to each other, so that they will not engage the tire $m$, but will engage the vertical flanges $q$ of the rim $r$, which is secured upon the fellies $s$ in the customary manner. By my novel construction, it will be perfectly apparent that all the strain which has hitherto been thrown upon the tire $m$ in backing is removed from the tire, which when it is of rubber, as is preferable, of course, is seriously affected by the strain, whereas the rim $r$, which is of metal, is not seriously affected thereby.

It will be noted that the angle of the groove in the reverse disk is very acute, especially on its engaging surfaces, and this is essential, as the traction effect of the reverse disk upon the traction wheel results from the wedging action possible with this acute angle, rather than from direct pressure on the wheel, as would be the case with the structure of my prior patent.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a traction wheel having a tread surface and carrying a tire rim, of a driving disk having a deep groove whose sides set at an acute angle to each other are adapted to engage the outer edges of the rim, which edges have a corresponding angle; and means for rotating the disk.

2. In a device of the class described, the combination with the traction wheel carrying a tire rim, and a tire centrally disposed on said rim and of less width than the rim, of a driving disk having a deep groove whose sides set at an acute angle to each other are adapted to engage the outer edges of the rim, which edges have a corresponding angle; and means for rotating the disk.

3. In a device of the class described, the combination with the traction wheel carrying the flanged tire rim, and a tire centrally disposed on said rim between the flanges, of a driving disk having the deep groove whose sides set at an acute angle to each other are adapted to engage the outer sides of the flanges, which sides have a corresponding angle, and means for rotating the disk.

In witness whereof, I have hereunto set my hand and affixed my seal, this 17th day of April, A D., 1907.

HENRY K. HOLSMAN. [L. S.]

Witnesses:
JOHN HOWARD McELROY.
M. S. REEDER.